US012632082B2

(12) United States Patent
Hewett

(10) Patent No.: US 12,632,082 B2
(45) Date of Patent: *May 19, 2026

(54) HOOD DEVICE AND METHODS OF REDUCING SCREEN GLARE FOR A HANDHELD ELECTRONIC DEVICE

(71) Applicant: Aspen Idea Lab, LLC, Aspen, CO (US)

(72) Inventor: Christopher Hewett, Aspen, CO (US)

(73) Assignee: Aspen Idea Lab, LLC, Aspen, CO (US)

( * ) Notice: Subject to any disclaimer, the term of this patent is extended or adjusted under 35 U.S.C. 154(b) by 342 days.

This patent is subject to a terminal disclaimer.

(21) Appl. No.: 18/201,542

(22) Filed: May 24, 2023

(65) Prior Publication Data

US 2024/0393826 A1 Nov. 28, 2024

(51) Int. Cl.
*G06F 1/16* (2006.01)
*H04M 1/02* (2006.01)

(52) U.S. Cl.
CPC .......... *G06F 1/1603* (2013.01); *H04M 1/026* (2013.01)

(58) Field of Classification Search
CPC .... G06F 1/1626; G06F 1/1656; G06F 1/1684; G06F 1/1633; G06F 1/1603;
(Continued)

(56) References Cited

U.S. PATENT DOCUMENTS 9,351,415 B2 5/2016 Zaccaria
9,742,457 B2 8/2017 Tymus
(Continued)

FOREIGN PATENT DOCUMENTS

CN 202918350 U 5/2013
CN 113534897 * 10/2021 ........... G06F 1/1633
(Continued)

OTHER PUBLICATIONS

Shady Smart Anti-Glare Phone Sunshade/Privacy Hood—2022 Model: Handheld/Self-supporting Shade with Camera Window (https://shadysmart.com/?variant=14203334950978).

(Continued)

*Primary Examiner* — Daniel St Cyr

(74) *Attorney, Agent, or Firm* — Dinsmore & Shohl LLP

(57) ABSTRACT

A hood device for reducing screen glare of a handheld electronic device includes a lower device holder including a first holder sidewall portion, a second holder sidewall portion opposite the first holder sidewall portion, and a rear holder wall portion that extends between the first and second holder sidewall portions. A bottom holder wall portion extends between the first and second holder sidewall portions and outward from the rear holder wall portion. A top holder wall portion is opposite the bottom holder wall portion and extends inward from the first and second holder sidewall portions and inward from the rear holder wall portion defining a storage volume sized and configured to hold the handheld electronic device therein. The top holder wall portion includes a viewing area where the storage volume can be viewed through the top holder sidewall portion. An upper hood extends outward from the lower device holder beyond the top holder wall portion. The upper hood has a collapsed configuration where the rear hood wall portion folds over the viewing area thereby covering the viewing area and a viewing configuration where the rear hood wall portion extends outward from the top holder wall portion thereby exposing the viewing area.

20 Claims, 5 Drawing Sheets

(58) Field of Classification Search
CPC ...... G06F 1/1632; G06F 1/1613; G06F 1/203;
H04M 1/0202; H04M 1/026
USPC ........................................................ 359/601
See application file for complete search history.

(56) References Cited

U.S. PATENT DOCUMENTS

| | | | |
|---|---|---|---|
| 10,021,227 B2 | 7/2018 | Gander et al. | |
| 10,310,559 B2 | 6/2019 | Holmes | |
| 10,368,622 B1 | 8/2019 | Eckert | |
| 10,963,010 B1 * | 3/2021 | Griffin | G02B 27/0018 |
| 11,332,954 B1 * | 5/2022 | Chase | E04H 15/58 |
| 2013/0265643 A1 | 10/2013 | Armstrong | |
| 2019/0097669 A1 | 3/2019 | Zaccaria | |
| 2021/0085074 A1 * | 3/2021 | Trantham | A47B 23/06 |
| 2021/0389794 A1 | 12/2021 | Nagy | |
| 2022/0043487 A1 * | 2/2022 | Sheiner | G06F 1/1686 |
| 2024/0180307 A1 * | 6/2024 | Sheiner | G06F 1/1603 |

FOREIGN PATENT DOCUMENTS

| | | |
|---|---|---|
| DE | 102011052498 A1 | 2/2013 |
| KR | 20160086456 A | 7/2016 |
| WO | 2012045563 A2 | 4/2012 |

OTHER PUBLICATIONS

International Search Report and Written Opinion for Appln. No. PCT/US2024/030728, mailed Sep. 20, 2024, 18 pages.

* cited by examiner

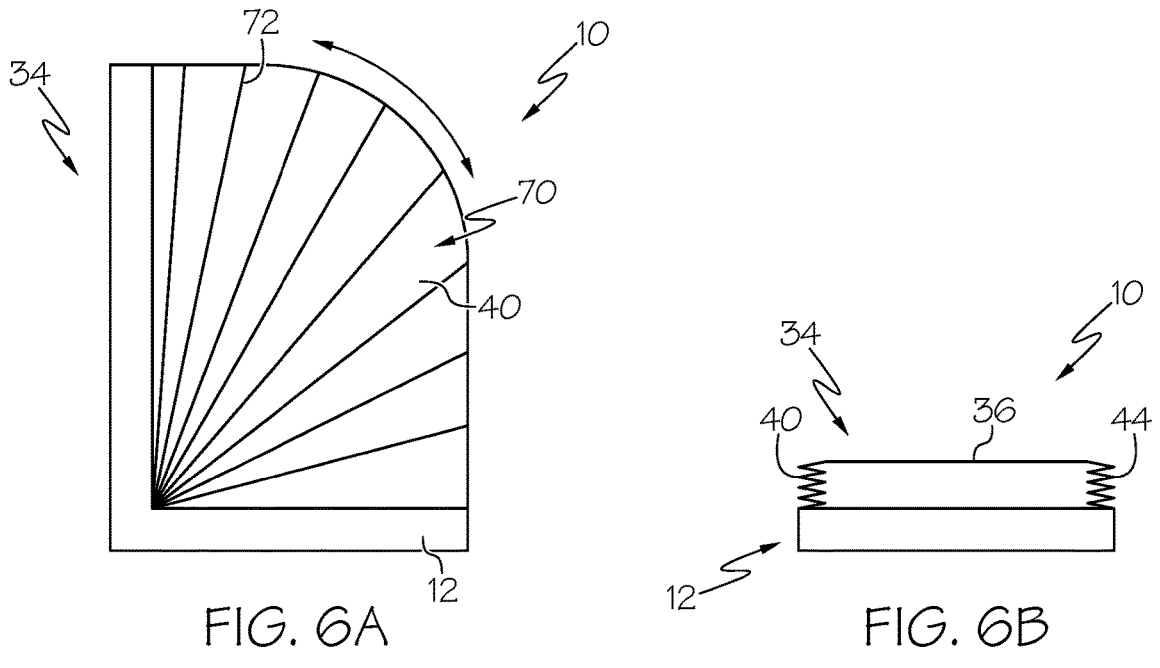
FIG. 6A
FIG. 6B
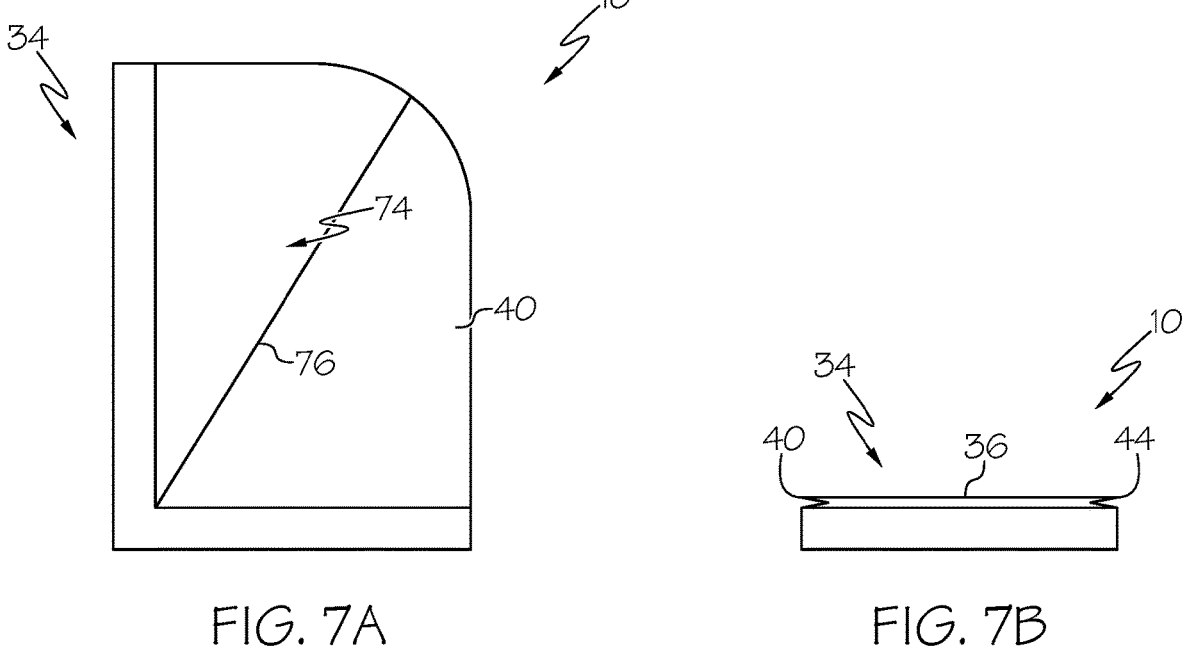
FIG. 7A
FIG. 7B

1

HOOD DEVICE AND METHODS OF REDUCING SCREEN GLARE FOR A HANDHELD ELECTRONIC DEVICE

TECHNICAL FIELD

The present specification generally relates to shade devices for handheld electronic devices and method of reducing screen glare for handheld electronic devices using shade devices.

BACKGROUND

Devices are known for reducing screen glare for handheld electronic devices. However, many of these devices are expensive to manufacture and cumbersome to use and transport.

Accordingly, a need exists for other devices that reduce screen glare for handheld electronic devices and methods of reducing screen glare using such devices.

SUMMARY

In one embodiment, a hood device for reducing screen glare of a handheld electronic device includes a lower device holder including a first holder sidewall portion, a second holder sidewall portion opposite the first holder sidewall portion, and a rear holder wall portion that extends between the first and second holder sidewall portions. A bottom holder wall portion extends between the first and second holder sidewall portions and outward from the rear holder wall portion. A top holder wall portion is opposite the bottom holder wall portion and extends inward from the first and second holder sidewall portions and inward from the rear holder wall portion defining a storage volume sized and configured to hold the handheld electronic device therein. The top holder wall portion includes a viewing area where the storage volume can be viewed through the top holder sidewall portion. An upper hood extends outward from the lower device holder beyond the top holder wall portion. The upper hood includes a rear hood wall portion that extends outward from the rear holder wall portion. A first lower edge of the rear hood wall portion at least partially spans the rear holder wall portion and the top holder wall portion. A first hood sidewall portion extends outward from the first holder wall portion. A second lower edge of the first hood sidewall portion at least partially spans the first holder sidewall portion and the top holder wall portion. A second hood sidewall portion extends outward from the second holder sidewall portion. A third lower edge of the second hood sidewall portion at least partially spans the second holder sidewall portion and the top holder wall portion. The upper hood has a collapsed configuration where the rear hood wall portion folds over the viewing area thereby covering the viewing area and a viewing configuration where the rear hood wall portion extends outward from the top holder wall portion thereby exposing the viewing area.

In another embodiment, a method of forming a hood device for reducing screen glare of a handheld electronic device is provided. The method includes forming a lower device holder including a first holder sidewall portion, a second holder sidewall portion opposite the first holder sidewall portion, and a rear holder wall portion that extends between the first and second holder sidewall portions. A bottom holder wall portion extends between the first and second holder sidewall portions and outward from the rear holder wall portion and a top holder wall portion that is opposite the bottom holder wall portion and that extends inward from the first and second holder sidewall portions and inward from the rear holder wall portion defining a storage volume sized and configured to hold the handheld electronic device therein. An upper hood is formed comprising: a rear hood wall portion that extends outward from the rear holder wall portion. A first lower edge of the rear hood wall portion at least partially spans the rear holder wall portion and the top holder wall portion. A first hood sidewall portion is formed that extends outward from the first holder wall portion. A second lower edge of the first hood sidewall portion at least partially spans the first holder sidewall portion and the top holder wall portion. A second hood sidewall portion is formed that extends outward from the second holder sidewall portion. A third lower edge of the second hood sidewall portion at least partially spans the second holder sidewall portion and the top holder wall portion.

In another embodiment, an upper hood is sized and configured to extend at least partially about a viewing area of a lower device holder that is sized and configured to receive a handheld electronic device in a storage volume formed therein. The upper hood includes a rear hood wall portion that is configured to extend outward from a rear holder wall portion of the lower device holder. A first lower edge of the rear hood wall portion is sized and configured to at least partially span the rear holder wall portion and a top holder wall portion of the lower device holder. A first hood sidewall portion is configured to extend outward from a first holder wall portion of the lower device holder. A second lower edge of the first hood sidewall portion is sized and configured to at least partially span a first holder sidewall portion of the lower device holder and the top holder wall portion. A second hood sidewall portion is configured to extend outward from a second holder sidewall portion of the lower device holder. A third lower edge of the second hood sidewall portion is sized and configured to at least partially span a second holder sidewall portion of the lower device holder and the top holder wall portion. The upper hood has a collapsed configuration where the rear hood wall portion folds over the viewing area thereby covering the viewing area and a viewing configuration where the rear hood wall portion extends outward from the top holder wall portion thereby exposing the viewing area.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6A is a side view of the hood device of FIG. 1 with folding features in a viewing configuration, according to one or more embodiments shown and described herein;

FIG. 6B is a front view of the hood device of FIG. 6A in a collapsed configuration, according to one or more embodiments shown and described herein;

FIG. 7A is a side view of the hood device of FIG. 1 with folding features in a viewing configuration, according to one or more embodiments shown and described herein;

FIG. 7B is a front view of the hood device of FIG. 7A in a collapsed configuration, according to one or more embodiments shown and described herein.

DETAILED DESCRIPTION

Embodiments described herein are generally related to a hood device for reducing screen glare of a handheld electronic device. The hood device includes a lower device holder including a first holder sidewall portion, a second holder sidewall portion opposite the first holder wall, a rear holder wall portion that extends between the first and second holder sidewall portions, a bottom holder wall portion that extends between the first and second holder sidewall portions and outward from the rear holder wall portion and a top holder wall portion that is opposite the bottom holder wall portion and that extends between the first and second holder sidewall portions and outward from the rear holder wall portion defining a storage volume sized and configured to hold the handheld electronic device therein. The top wall includes a viewing area where the storage volume can be viewed through the top holder wall. An upper hood extends outward from the lower device holder beyond the top holder wall portion. The upper hood includes a rear hood wall portion that extends outward from the rear holder wall portion. A first lower edge of the rear hood wall portion at least partially spans the rear holder wall portion and the top holder wall portion. A first hood sidewall portion extends outward from the first holder sidewall portion. A second lower edge of the first hood sidewall portion at least partially spans the first holder sidewall portion and the top holder wall portion. A second hood sidewall portion extends outward from the second holder sidewall portion. A third lower edge of the second hood sidewall portion at least partially spans the second holder sidewall portion and the top holder sidewall portion. The upper hood has a collapsed configuration where the rear hood wall portion folds over the viewing area thereby covering the viewing area and a viewing configuration where the rear hood wall portion extends outward from the top holder wall portion thereby exposing the viewing area.

Figures 3, 4:
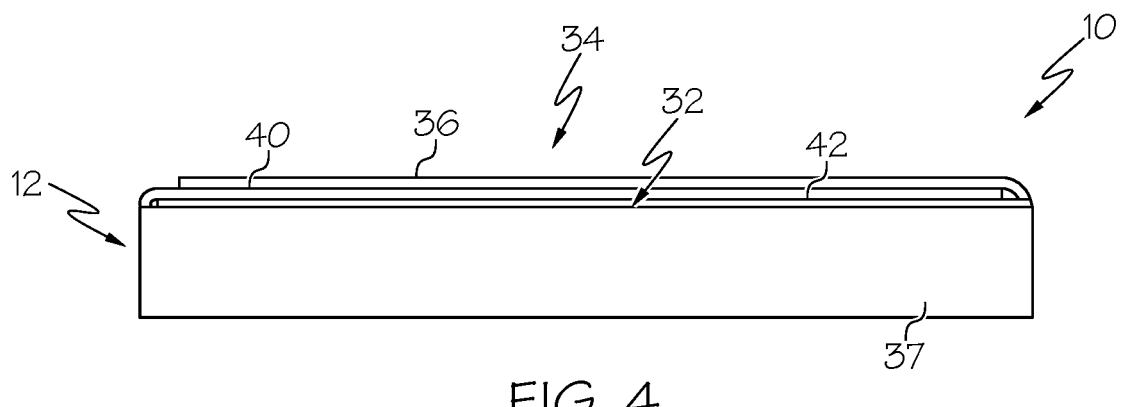
FIG. 3 is a perspective view of the hood device of FIG. 1.
FIG. 4 is a front view of the hood device of FIG. 1 in a collapsed configuration.

As used herein, the "lengthwise direction" is the front-to-rear direction where the viewing area is visible with the hood device in the viewing configuration (i.e., the X-direction shown in FIG. 3). The "widthwise direction" is transverse to the lengthwise direction (i.e., the Y-direction shown in FIG. 3).

Figure 1:
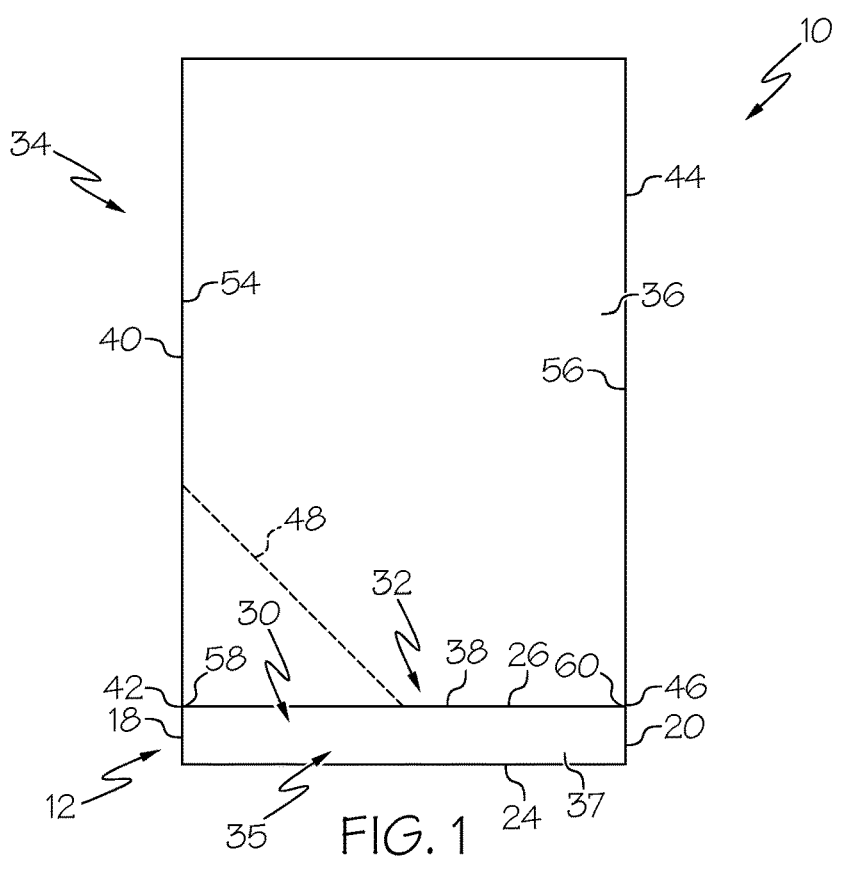
FIG. 1 is a front view of a hood device for shielding a handheld electronic device from the sun, according to one or more embodiments shown and described above.
Figure 2:
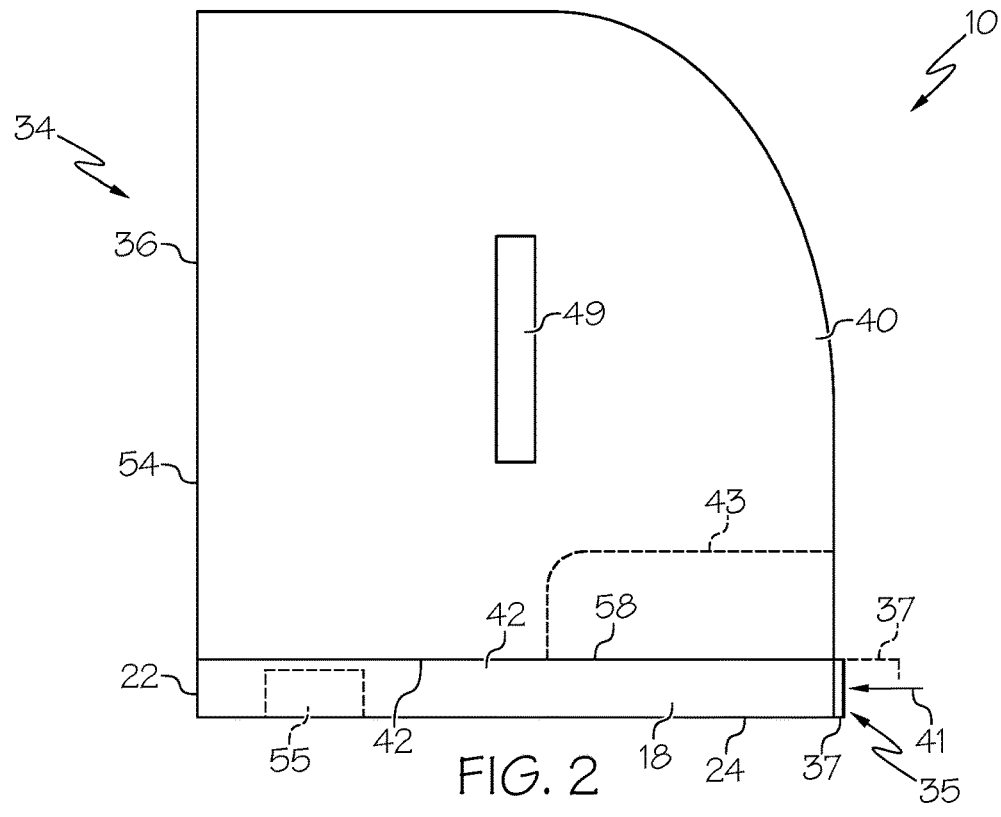
FIG. 2 is a side view of the hood device of FIG. 1.

Referring to FIGS. 1-3, a hood device 10 is shown in a viewing configuration and includes a lower device holder 12 that is a compartment that is sized to hold a handheld electronic device 14 (FIG. 3). Examples of handheld electronic devices include smartphones and tablets that can be viewed in one or either of a portrait or landscape orientation. In the example of FIGS. 1-3, the hood device 10 is intended to be used in the portrait orientation. Of course, the orientation of the hood device 10 can depend on the orientation of the handheld electronic device 14 and how the handheld electronic device 14 is being used. Generally, the orientation of the hood device 10 can be determined using the location of a rear hood wall portion 36 being located at a top of the handheld electronic device 14 with the electronic device 14 located in the lower device holder 12.

The lower device holder 12 includes a first holder sidewall portion 18 and a second holder sidewall portion 20 opposite the first holder sidewall portion 18. A rear holder wall portion 22 extends between the first and second holder sidewall portions 18 and 20. A bottom holder wall portion 24 extends between the first and second holder sidewall portions 18 and 20 and outward from the rear holder wall portion 22. A top holder wall portion 26 is opposite the bottom holder wall portion 24 and extends between the first and second holder sidewall portions 18 and 20 and outward from the rear holder wall portion 22. The first and second holder sidewall portions 18 and 20, rear holder wall portion 22, bottom holder wall portion 24 and top holder wall portion 26 together define a storage volume 30 that is sized and configured to hold the handheld electronic device 14 therein.

The top holder wall portion 26 includes a viewing area 32 (FIG. 3) where the storage volume 30 can be viewed through the top holder wall portion 26. The viewing area 32 can be formed by any suitable structure or lack thereof, such as an opening 33 through the top holder wall portion 26 and a transparent sheet 39 covering the opening 33 from one or both of the inside or outside of the lower device holder 12, such as formed out of plastic or glass. In some embodiments, the viewing area 32 may be formed using just the opening 33 without the transparent sheet 39.

The lower device holder 12 may further include a device receiving opening 35 at a front end of the lower device holder 12. The device receiving opening 35 can provide a location of ingress and egress for the handheld electronic device into and out of the storage volume 30. In some embodiments, a lid 37 may be provided that has a closed configuration as shown by solid lines and an open configuration as shown by the dashed lines of FIG. 2. The lid 37, for example, may be formed as a flap that is part of the top or bottom holder wall portions 26 or 24. In other embodiments, the lid 37 may be formed separately from the lower device holder 12 and connected thereto. The lid 37 may be placed in the open configuration to provide access to the device receiving opening so that the handheld electronic device 14 can be inserted through the device receiving opening 35 and into the storage volume 30, as represented by arrow 41.

An upper hood 34 extends outward from the lower device holder 12 beyond the top holder wall portion 26 in the viewing configuration. The upper hood 34 includes a rear hood wall portion 36 that extends outward from the rear holder wall portion 22. A first lower edge 38 of the rear hood wall portion 36 at least partially spans the widthwise direction of the rear holder wall portion 22 and the top holder wall portion 26. A first hood sidewall portion 40 extends outward from the first holder sidewall portion 18. A second lower edge 42 of the first hood sidewall portion 40 at least partially spans a lengthwise direction of the first holder sidewall portion 18 and the top holder wall portion 26. A second hood sidewall portion 44 extends outward from the second holder sidewall portion 20. A third lower edge 46 of the second hood sidewall portion 44 at least partially spans a lengthwise direction of the second holder sidewall portion 20 and the top holder sidewall portion 26.

The upper hood 34 has a viewing configuration where the rear hood wall portion extends outward from the top holder wall portion 26 thereby exposing the viewing area 32 (FIGS. 1-3). As will be described below, the upper hood 34 has a collapsed configuration (FIG. 4) where the rear hood wall portion 36 folds over the viewing area 32 relative to the lower device holder 12 thereby covering the viewing area 32. As represented by dashed lines in FIG. 1, a support member 48, such as a small rod, may be used to hold the upper hood 34 in the viewing configuration in a reliable fashion. The support member 48 may be positioned along the rear hood wall portion 36 or any of the first and second hood sidewall portions 40 and 44 in order to support the upper hood in the viewing configuration. In some embodiments, the upper hood may have a pocket 49 in which the support member 48 may be placed in an stowed when not in use. While the pocket 49 is illustrated as on the first hood sidewall portion 40, it may be provided at any suitable location on the upper hood 34 and/or the lower device holder 12. More than one pocket may be provided, for example, for storage of other items, such as credit cards, etc.

The hood device 10 may be formed using any suitable materials and processes. For example, the hood device 10 may be formed using one or more sheets of cardboard or other paper material, plastic, etc. that can be folded and creased into desired shapes. Other materials or combinations of materials may be used such as paper material sheets covered by another material, such as a leather or synthetic leather material. In some embodiments, the hood device 10 may be formed of an inexpensive paper or plastic and intended to be disposable. For example, the lower device holder 12 may be formed using a first sheet of a paper material that is folded into the illustrated rectangular shape to form the various holder wall portions and the upper hood 34 may be formed from a second sheet of a paper material to form its hood wall portions. The upper hood 34 and the lower device holder 12 may then be connected together using any suitable material, such as glue, hook and loop fasteners, snaps, clips, etc. In some embodiments, the upper hood 34 and the lower device holder 12 or at least portions thereof may be formed together from a single piece of material such that they are integrally formed together. In other embodiments, the upper hood 34 may be formed to be releasable and connectable to the lower device holder 12 or to other suitable lower device holders not necessarily provided with the upper hood 34. For example, the lower device holder 12 may be formed from a flexible plastic material forming a sleeve for receiving the handheld electronic device 14. In some embodiments, the lower device holder 12 may be formed of a more rigid plastic forming a case.

Figure 5:
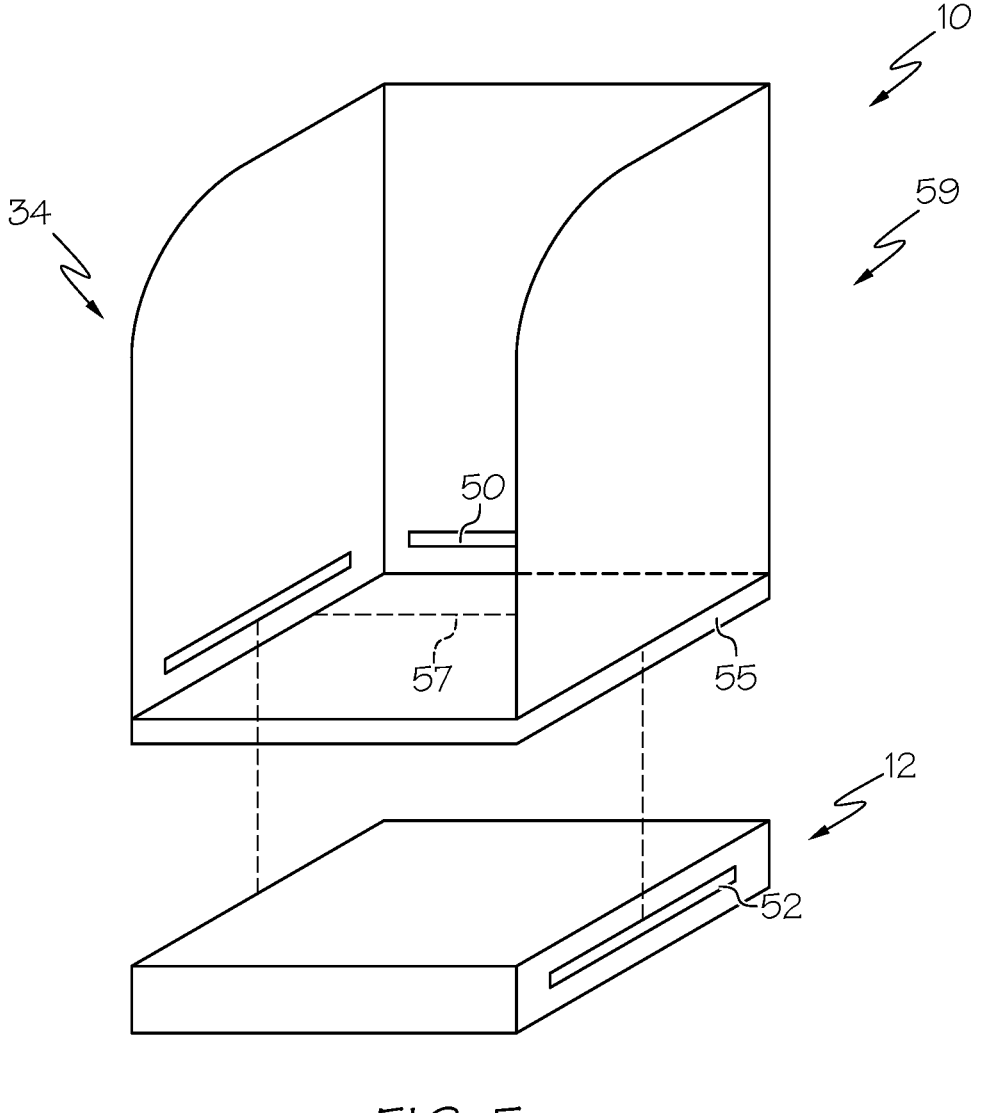
FIG. 5 is a perspective view of the hood device of FIG. 1 with separable upper hood and lower device holder, according to one or more embodiments shown and described herein.

For example, referring to FIG. 5, the hood device 10 is shown including separated upper hood 34 and lower device holder 12 that can be releasably connected together using hook and loop fastener connecting components 50 and 52. In this embodiment, the upper hood 34 and the lower device holder 12 may form a system, collectively element 59, that can be connected together using cooperating interconnecting structures. Other suitable connecting components may be used such as a clasp represented by dashed lines 57, snaps, clips or other features such as indentations may be used, either on the upper hood 34 or lower device holder 12 or both the upper hood 34 and the lower device holder 12. In some embodiments, the upper hood 34 may be configured to connect to a separate lower device holder 12 and the upper hood 34 and the lower device holder 12 may be packaged together or separately and used as the system 59. The upper hood 34 may be configured to interconnect specifically with the particular lower device holder 12 configuration with cooperating connections as discussed above. For example, the cooperating connections between the upper hood 34 and the lower device holder 12 may be arranged and configured to cooperatively connect together for the specific upper hood 34 and lower device holder 12 configurations. In some embodiments, to facilitate a free standing upper hood 34, the upper hood 34 may include a base 55 that extends outward from one or more of the wall portions 36, 40 and/or 44 and is connected or connectable thereto that can be arranged to rest on a support surface, such as a table or desk top and/or be connectable to the device holder 12 with a suitable connection. The base 55 may be foldable to fold up with the rest of the upper hood 34 in a stowed configuration and then moved to a deployed configuration to support the upper hood 34 in an upright, standing position.

As represented by dashed lines in FIG. 2, spacer members 61 may be provided in the storage volume 30 to limit movement of the handheld electronic device 14 when inside the lower device holder 12. The spacer members 61 may be, for example, blocks formed of foam, rubber, etc. Further, as represented by dashed line 43, a notch may be provided that is sized to allow a user's finger to extend therethrough for side access to the handheld electronic device 14.

Referring to FIG. 3, as noted above, the upper hood 34 can move from the viewing configuration of FIGS. 1-3 and the collapsed configuration of FIG. 4. For example, the first and second hood sidewall portion 40 and 44 may be connected to the rear hood wall portion 36 along hinge lines 54 (FIG. 1) and 56. The hinge lines 54 and 56 may be formed using any suitable connection, such as a living hinge or flexible connector, such as an adhesive tape or other strip of material. Further, the first and second hood sidewall portions 40 and 44 may be connected to the first and second holder sidewall portions 18 and 20 along hinge lines 58 (FIG. 1) and 60. The rear hood wall portion 36 may be connected to the rear holder wall portion 22 along another hinge line 62 (FIG. 3). The hinge lines 54, 56, 58, 60 and 62 are configured to allow the respective first and second hood sidewall portions 40 and 44 and rear hood wall portion 36 to rotate or pivot relative to the lower device holder 12 toward the collapsed configuration as represented by arrows 64, 66 and 68. FIG. 4 illustrates a representative example of the upper hood 34 in the collapsed configuration. In the collapsed configuration, one or all of the first and second hood sidewall portions 40 and 44 and rear hood wall portion 36 are folded over the viewing area 32 thereby hiding the viewing area 32 from view.

Referring now to FIGS. 6A-7B, the first and second hood sidewall portions 40 and 44 may be provided with any suitable folding feature to facilitate the movement of the first and second hood sidewall portions 40 and 44. The rear hood wall portion 36 may also include folding features. As examples, referring first to FIG. 6A, the first and second hood sidewall portions 40 and 44 may include folding features 70 in the form of bellows or pleats 72. The pleats 72 can fold toward the lower device holder 12 and upon themselves to the collapsed configuration, as shown by FIG. 6B. Referring to FIG. 7A, in another embodiments the first and second hood sidewall portions 40 and 44 may include folding features 74 in the form of folds 76, for example, origami-type fold that fold in a somewhat complex pattern to achieve folding patterns of oblique fold lines in the collapsed configuration as shown by FIG. 7B. The folding features 70 and 74 or otherwise may or may not fold over the viewing area 32.

Figure 8:
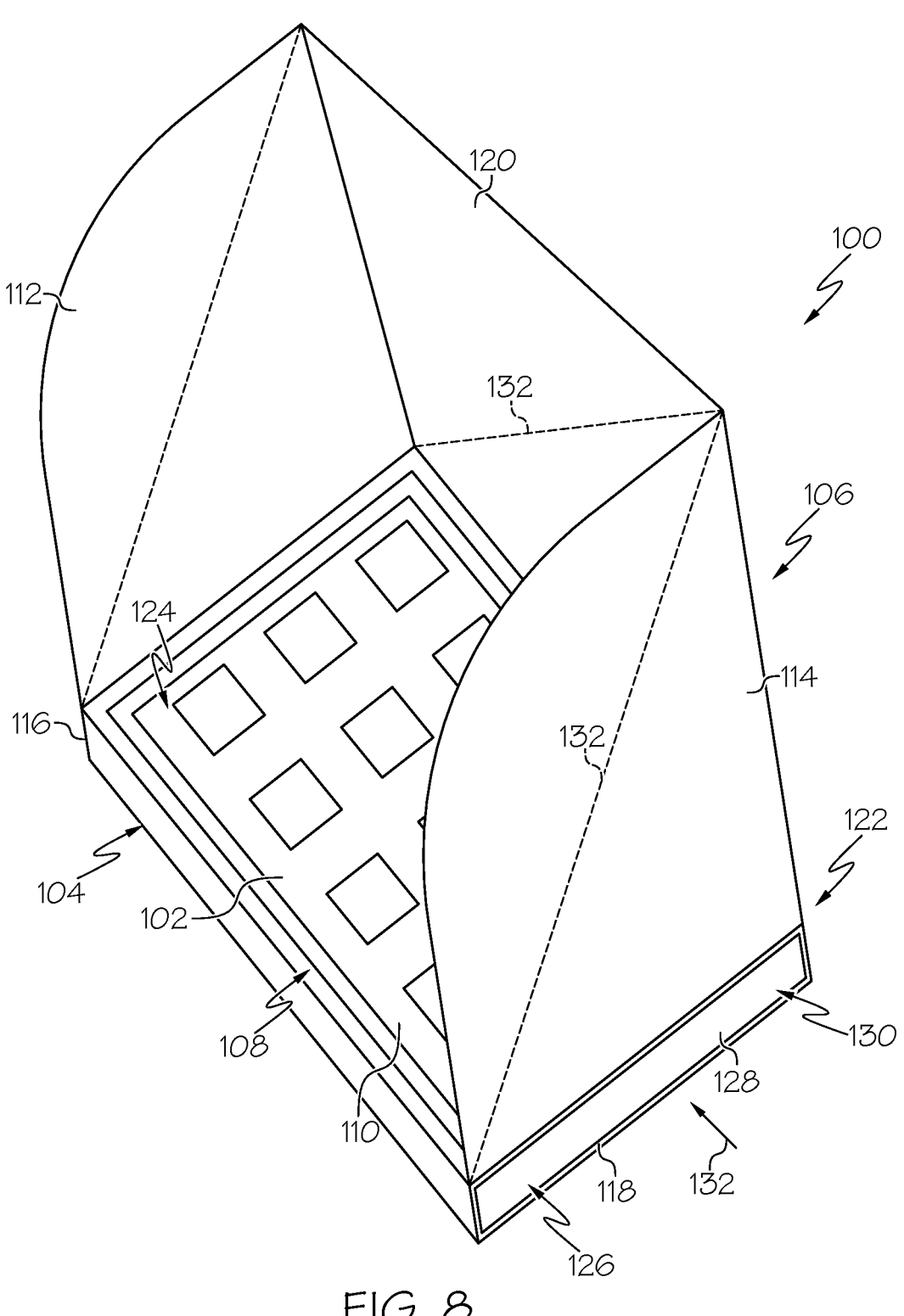
FIG. 8 is a perspective view of a hood device in a landscape orientation, according to one or more embodiments shown and described herein.

Referring to FIG. 8, another hood device 100 is configured for use in a landscape orientation, such as for use with a tablet 102. The hood device 100 includes a lower device holder 104 and a upper hood 106. The lower device holder 104 forms a storage volume 108 that is sized to receive a handheld electronic device 110 in a landscape orientation through device receiving opening 130 as represented by arrow 132. In this regard, the upper hood 106 includes first and second hood sidewall portions 112 and 114 that span lengthwise shorter sides 116 and 118 of the lower device holder 104 and a rear hood wall portion 120 that spans widthwise longer side 122 of the lower device holder 104. As can be seen, the device receiving opening 130 is located at one of the shorter sides 118 that is orthogonal to the rear hood wall portion 120 rather than the side that is parallel to the rear hood wall portion in the portrait orientation shown described above. Similar to above, the lower device holder includes a viewing area 124, a device receiving opening 126 and a lid 128. The first and second hood sidewall portions 112 and 114 can fold using any of the folding features discussed above or any other suitable folding feature, for example, as represented by dashed line 130. Further, the hood device 100 can include any of the other features discussed above, such as a support member 132 and pocket 134 located at any suitable location on the upper hood 106. Also, the upper hood 106 may be detachable from the lower device holder 104 and releasable connectable thereto in a fashion similar to that described with reference to FIG. 5.

The above-described hood device provide an upper hood that can provide both privacy, by providing a viewing shield around the viewing area, and shade, by blocking light from the sun which can cause glare making it difficult to see the handheld electronic device. In some embodiments, the upper hood may be separable and releasably connectable to the lower device holder thereby providing a system of the upper hood and lower device holder that is sized and configured to receive the handheld electronic device. In this regard, the lower device holder and the upper hood may be provided together in a single package or packaged separately and connected together by the end user. The upper hood may include any suitable connectors that are configured to connect to cooperating connectors formed into and/or carried by the lower device holder.

Embodiments can be described with reference to the following numbered clauses, with certain features laid out in the dependent clauses:

Clause 1: A hood device for reducing screen glare of a handheld electronic device, the hood device comprising: a lower device holder including a first holder sidewall portion, a second holder sidewall portion opposite the first holder sidewall portion, a rear holder wall portion that extends between the first and second holder sidewall portions, a bottom holder wall portion that extends between the first and second holder sidewall portions and inward from the rear holder wall portion and a top holder wall portion that is opposite the bottom holder wall portion and that extends inward from the first and second holder sidewall portions and inward from the rear holder wall portion defining a storage volume sized and configured to hold the handheld electronic device therein; wherein the top holder wall portion includes a viewing area where the storage volume can be viewed through the top holder sidewall portion; and an upper hood that extends outward from the lower device holder beyond the top holder wall portion, the upper hood comprising: a rear hood wall portion that extends outward from the rear holder wall portion, a first lower edge of the rear hood wall portion at least partially spanning the rear holder wall portion and the top holder wall portion; a first hood sidewall portion that extends outward from the first holder wall portion, a second lower edge of the first hood sidewall portion at least partially spanning the first holder sidewall portion and the top holder wall portion; and a second hood sidewall portion that extends outward from the second holder sidewall portion, a third lower edge of the second hood sidewall portion at least partially spanning the second holder sidewall portion and the top holder wall portion; wherein the upper hood has a collapsed configuration where the rear hood wall portion folds over the viewing area thereby covering the viewing area and a viewing configuration where the rear hood wall portion extends outward from the top holder wall portion thereby exposing the viewing area.

Clause 2: The hood device of clause 1, wherein the lower device holder comprises a lid configured to close a device receiving opening.

Clause 3: The hood device of claim 2, wherein the lid extends outward from one of the top or bottom holder wall portions in an open configuration.

Clause 4: The hood device of any of clauses 1-3, wherein at least one of the first and second hood sidewall portions comprise folding features configured to facilitate folding of the at least one of the first and second sidewall portions toward the collapsed configuration.

Clause 5: The hood device of clause 4, wherein the folding features comprise pleats configured to fold on top of one another.

Clause 6: The hood device of clause 4, wherein the folding features comprise folds that extend in oblique directions.

Clause 7: The hood device of any of clauses 1-6, wherein the rear hood wall portion is connected to the first and second hood sidewall portions along hinge lines.

Clause 8: The hood device of clause 7, wherein the rear hood wall portion and the first and second hood sidewall portions are connected to the lower device holder along other hinge lines.

Clause 9: The hood device of any of clauses 1-8, wherein the upper hood is releasable from the lower device holder using a releasable connectable component.

Clause 10: The hood device of clause 9, wherein the releasable connectable component comprises hook and loop fasteners.

Clause 11: The hood device of clause 9, wherein the releasable connectable component comprises a clasp.

Clause 12: The hood device of any of clauses 1-11 further comprising spacer members located in the storage volume arranged and configured to limit movement of the handheld electronic device in the storage volume.

Clause 13: The hood device of any of clauses 1-12 further comprising a support member configured to support the upper hood in the viewing configuration.

Clause 14: The hood device of any of clauses 1-13, wherein the lower device holder comprises a device receiving opening that extends along a side of the lower device holder that is parallel to the rear hood wall portion.

Clause 15: The hood device of any of clauses 1-14, wherein the lower device holder comprises a device receiving opening that extends along a side of the lower device holder that is orthogonal to the rear hood wall portion.

Clause 16: A method of forming a hood device for reducing screen glare of a handheld electronic device, the method comprising: forming a lower device holder comprising a first holder sidewall portion, a second holder sidewall portion opposite the first holder sidewall portion, a rear holder wall portion that extends between the first and second holder sidewall portions, a bottom holder wall portion that extends between the first and second holder sidewall portions and inward from the rear holder wall portion and a top holder wall portion that is opposite the bottom holder wall portion and that extends inward from the first and second holder sidewall portions and inward from the rear holder wall portion defining a storage volume sized and configured to hold the handheld electronic device therein; and forming an upper hood comprising: a rear hood wall portion that extends outward from the rear holder wall portion, a first lower edge of the rear hood wall portion at least partially spanning the rear holder wall portion and the top holder wall portion; a first hood sidewall portion that extends outward from the first holder wall portion, a second lower edge of the first hood sidewall portion at least partially spanning the first holder sidewall portion and the top holder wall portion; and a second hood sidewall portion that extends outward from the second holder sidewall portion, a third lower edge of the second hood sidewall portion at least partially spanning the second holder sidewall portion and the top holder wall portion.

Clause 17: The method of clause 16 further comprising forming fold lines in the first and second hood sidewall portions such that the upper hood is moveable from a viewing configuration to a collapsed configuration.

Clause 18: The method of clause 16 or 17 further comprising connecting the upper hood to the lower device holder.

Clause 19: The method of claim 18, wherein the step of connecting includes connecting the upper hood to the lower hood using a releasable connector component.

Clause 20: The method of claim 16 further comprising closing a device receiving opening providing access to the storage volume using a lid.

Clause 21: An upper hood sized and configured to extend at least partially about a viewing area of a lower device holder that is sized and configured to receive a handheld electronic device in a storage volume formed therein, the upper hood comprising: a rear hood wall portion configured to extend outward from a rear holder wall portion of the lower device holder, a first lower edge of the rear hood wall portion sized and configured to at least partially span the rear holder wall portion and a top holder wall portion of the lower device holder; a first hood sidewall portion that is configured to extend outward from a first holder wall portion of the lower device holder, a second lower edge of the first hood sidewall portion sized and configured to at least partially span a first holder sidewall portion of the lower device holder and the top holder wall portion; and a second hood sidewall portion that is configured to extend outward from a second holder sidewall portion of the lower device holder, a third lower edge of the second hood sidewall portion sized and configured to at least partially span a second holder sidewall portion of the lower device holder and the top holder wall portion; wherein the upper hood has a collapsed configuration where the rear hood wall portion folds over the viewing area thereby covering the viewing area and a viewing configuration where the rear hood wall portion extends outward from the top holder wall portion thereby exposing the viewing area.

Clause 22: The upper hood of clause 21 further comprising a connector that is arranged and configured to connect to a cooperating connector carried by the lower device holder to releasably connect the upper hood to the lower device holder.

Clause 23: The upper hood of clause 22, wherein the connector is one of multiple connectors, wherein one or more of the first hood sidewall portion, second hood sidewall portion and rear hood wall portion comprises one or more of the multiple connectors that are arranged and configured to releasably connect to cooperating connectors carried by the lower device holder.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hood device for reducing screen glare of a handheld electronic device, the hood device comprising:
   a lower device holder including a first holder sidewall portion, a second holder sidewall portion opposite the first holder sidewall portion, a rear holder wall portion that extends between the first and second holder sidewall portions, and a top holder wall portion that extends inward from the first and second holder sidewall portions and inward from the rear holder wall portion defining a storage volume sized and configured to hold the handheld electronic device therein;
   wherein the top holder wall portion includes a viewing area where the storage volume can be viewed through the top holder sidewall portion; and
   an upper hood that extends outward from the lower device holder beyond the top holder wall portion, the upper hood comprising:
      a rear hood wall portion that extends outward from the rear holder wall portion, a first lower edge of the rear hood wall portion at least partially spanning the rear holder wall portion and the top holder wall portion;
      a first hood sidewall portion that extends outward from the first holder wall portion, a second lower edge of the first hood sidewall portion at least partially spanning the first holder sidewall portion and the top holder wall portion; and
      a second hood sidewall portion that extends outward from the second holder sidewall portion, a third lower edge of the second hood sidewall portion at least partially spanning the second holder sidewall portion and the top holder wall portion;
      wherein the upper hood has a collapsed configuration where the rear hood wall portion folds over the viewing area thereby covering the viewing area and a viewing configuration where the rear hood wall portion extends outward from the top holder wall portion thereby exposing the viewing area;
      wherein the rear hood wall portion, first hood sidewall portion and second hood sidewall portion are formed as a single monolithic structure from a single sheet of material that spans the rear holder wall portion, the first holder sidewall portion and the second holder sidewall portion respectively.

2. The hood device of claim 1, wherein the lower device holder comprises a lid configured to close a device receiving opening.

3. The hood device of claim 2, wherein the lid extends outward from the top holder wall portion or a bottom holder wall portion in an open configuration.

4. The hood device of claim 1, wherein at least one of the first and second hood sidewall portions comprise folding features configured to facilitate folding of the at least one of the first and second sidewall portions toward the collapsed configuration.

5. The hood device of claim 4, wherein the folding features comprise pleats configured to fold on top of one another.

6. The hood device of claim 4, wherein the folding features comprise folds that extend in oblique directions.

7. The hood device of claim 1, wherein the rear hood wall portion is connected to the first and second hood sidewall portions along hinge lines.

8. The hood device of claim 7, wherein the rear hood wall portion and the first and second hood sidewall portions are connected to the lower device holder along other hinge lines.

9. The hood device of claim 1, wherein the upper hood is releasable from the lower device holder using a releasable connectable component.

10. The hood device of claim 9, wherein the releasable connectable component comprises hook and loop fasteners.

11. The hood device of claim 9, wherein the releasable connectable component comprises a clasp.

12. The hood device of claim 1 further comprising space members located in the storage volume arranged and configured to limit movement of the handheld electronic device in the storage volume.

13. The hood device of claim 1 further comprising a support member configured to support the upper hood in the viewing configuration.

14. The hood device of claim 1, wherein the lower device holder comprises a device receiving opening that extends along a side of the lower device holder that is parallel to the rear hood wall portion.

15. The hood device of claim 1, wherein the lower device holder comprises a device receiving opening that extends along a side of the lower device holder that is orthogonal to the rear hood wall portion.

16. A method of forming a hood device for reducing screen glare of a handheld electronic device, the method comprising:

forming a lower device holder comprising a first holder sidewall portion, a second holder sidewall portion opposite the first holder sidewall portion, a rear holder wall portion that extends between the first and second holder sidewall portions, and a top holder wall portion that extends inward from the first and second holder sidewall portions and inward from the rear holder wall portion defining a storage volume sized and configured to hold the handheld electronic device therein; and forming an upper hood from a single sheet of material, the upper hood comprising:

a rear hood wall portion that extends outward from the rear holder wall portion, a first lower edge of the rear hood wall portion at least partially spanning the rear holder wall portion and the top holder wall portion;

a first hood sidewall portion that extends outward from the first holder wall portion, a second lower edge of the first hood sidewall portion at least partially spanning the first holder sidewall portion and the top holder wall portion; and a second hood sidewall portion that extends outward from the second holder sidewall portion, a third lower edge of the second hood sidewall portion at least partially spanning the second holder sidewall portion and the top holder wall portion;

wherein the rear hood wall portion, first hood sidewall portion and second hood sidewall portion are formed as a single monolithic structure that spans the rear holder wall portion, the first holder sidewall portion and the second holder sidewall portion respectively.

17. The method of claim 16 further comprising forming fold lines in the first and second hood sidewall portions such that the upper hood is moveable from a viewing configuration to a collapsed configuration.

18. The method of claim 16 further comprising connecting the upper hood to the lower device holder.

19. The method of claim 18, wherein the step of connecting includes connecting the upper hood to the lower hood using a releasable connector component.

20. The method of claim 16 further comprising closing a device receiving opening providing access to the storage volume using a lid.

* * * * *